(12) United States Patent
Perales-Perez et al.

(10) Patent No.: US 10,139,377 B1
(45) Date of Patent: Nov. 27, 2018

(54) PREPARATIVE SIZE-EXCLUSION CHROMATOGRAPHY FOR SEPARATION AND PURIFICATION OF WATER-STABLE CD-BASED QUANTUM DOTS

(71) Applicants: Oscar Juan Perales-Perez, Mayagüez, PR (US); Felix Roberto Roman-Velasquez, Mayaguez, PR (US); Sonia Janet Bailon-Ruiz, Mayaguez, PR (US); Luis Alberto Alamo-Nole, Mayaguez, PR (US)

(72) Inventors: Oscar Juan Perales-Perez, Mayagüez, PR (US); Felix Roberto Roman-Velasquez, Mayaguez, PR (US); Sonia Janet Bailon-Ruiz, Mayaguez, PR (US); Luis Alberto Alamo-Nole, Mayaguez, PR (US)

(73) Assignee: University of Puerto Rico, San Juan, PR (US)

( * ) Notice: Subject to any disclaimer, the term of this patent is extended or adjusted under 35 U.S.C. 154(b) by 412 days.

(21) Appl. No.: 14/290,358

(22) Filed: May 29, 2014

Related U.S. Application Data

(60) Provisional application No. 61/828,279, filed on May 29, 2013.

(51) Int. Cl.
*G01N 1/18* (2006.01)
*G01N 30/74* (2006.01)
*G01N 30/02* (2006.01)

(52) U.S. Cl.
CPC ................................ *G01N 30/74* (2013.01)

(58) Field of Classification Search
CPC .......... G01N 30/74; G01N 30/02; G01N 1/18
USPC ........ 436/161, 174, 176, 177, 178; 977/700, 977/774
See application file for complete search history.

(56) References Cited

U.S. PATENT DOCUMENTS

| | | | | |
|---|---|---|---|---|
| 5,589,163 | A * | 12/1996 | Neill ..................... | A61K 8/447 424/70.2 |
| 2008/0063720 | A1* | 3/2008 | Gounko ............. | A61K 49/0067 424/489 |
| 2009/0221545 | A1* | 9/2009 | Giammona .......... | A61K 9/1075 514/183 |
| 2010/0195008 | A1* | 8/2010 | Hegmann ............. | B82Y 20/00 349/33 |
| 2013/0284979 | A1* | 10/2013 | Perez Donoso ..... | C09K 11/025 252/301.36 |

OTHER PUBLICATIONS

Luis Alamo-Nole et al., "Preparative size-exclusion chromatography for separation and purification of water-stable Cd-based quantum dots," Analytical Methods, Issue 10, 2012., vol. 4, pp. 3127-3132.*

(Continued)

*Primary Examiner* — Brian J. Sines
(74) *Attorney, Agent, or Firm* — Hoglund & Pamias, PSC; Roberto J. Rios

(57) ABSTRACT

The invention provides a SEC method for the separation of thiol-capped Cd(Se,S) quantum dots (QDs) synthesized in the aqueous phase. Nanocrystals-HPLC column interactions were suppressed using thioglycolic acid (TGA) as an ion pair agent. The SEC method of the invention allows a fast and reproducible separation of water-stable Cd(Se,S) QDs.

2 Claims, 5 Drawing Sheets

(56) References Cited

OTHER PUBLICATIONS

J. P. Wilcoxon, J. E. Martin and P. Provencio, Langmuir, 2000, 16, 9912-9920.
M. Krueger, A. M. Al-Somali, J. C. Falkner and V. L. Colvin, Anal. Chem., 2005, 77, 3511-3515.
A. M. Al-Somali, K. M. Krueger, J. C. Falkner and V. L. Colvin, Anal. Chem., 2004, 76, 5903-5910.
M. Wang, G. R. Bardajee, S. Kumar, M. Nitz, G. D. Scholes and M. A. Winnik, J. Chromatogr., A, 2009, 1216, 5011-5019.
T. Arita, T. Yoshimura and A. Tadafumi, Nanoscale, 2010, 2, 1467-1473.
S.-Y. Ding, M. Jones, M. P. Tucker, J. M. Nedeljkovic, J. Wall, M. N. Simon, G. Rumbles and M. E. Himmel, Nano Lett., 2003, 3.

* cited by examiner

Fig. 6

Hydrodynamic diameters and estimated nanocrystal sizes for obtained fractions of TGA-capped Cd(Se,S) QDs

| FC | Retention time (minutes) | MW[a] (kD) | HD[a] (nm) | Band gap (eV) | Crystal size[c] (nm) | Organic shell[d] (nm) |
|---|---|---|---|---|---|---|
| 1 | 8.8 | >401 | 98.2 ± 1.9 | 2.16 | 3.07 | 95.13 |
| 2 | 10.3 | >401 | 54.2 ± 1.9 | 2.19 | 3.02 | 51.15 |
| 3 | 11.2 | >401 | 35.3 ± 0.5 | 2.23 | 2.94 | 32.31 |
| 4 | 12.1 | 366 | 24.8 ± 1.0 | 2.41 | 2.58 | 22.22 |
| 5 | 12.7 | 232 | 24.9 ± 0.7 | 2.57 | 2.26 | 22.54 |
| QDs | 12.3 | ~319 | 34.3 ± 0.6 | 2.20 | 3.00 | 31.30 |

[a] HD: hydrodynamic diameter. [b] The molecular weight (MW) was calculated using the dextran standards and the calibration curve. [c] The crystal sizes were estimated assuming a linear relationship and the following correspondence: 2 nm–2.7 eV and 3 nm–2.2 eV.[24] [d] Organic shell was calculated by subtracting the estimated crystal size to the measured HD.

US 10,139,377 B1

PREPARATIVE SIZE-EXCLUSION CHROMATOGRAPHY FOR SEPARATION AND PURIFICATION OF WATER-STABLE CD-BASED QUANTUM DOTS

GOVERNMENT INTEREST

The claimed invention was made with U.S. Government support under grant number HRD 0833112 awarded by The National Science Foundation (NSF). The government has certain rights in this invention.

BACKGROUND OF THE INVENTION

The use and applications of Cd-based quantum dots (QDs) have increased in the past few years. Some desirable features of these nanostructures include their narrow emission spectra, large quantum yield, chemical stability against photo-bleaching, emission spectrum in the visible range and easy surface functionality. These characteristics enable the use of these QDs in biological staining, detection of bio-macromolecules, disease diagnostics, among others. Water-stable Cd-based QDs functionalized with organic materials have shown good chemical stability without affecting their optical properties. The functionalization of QDs using aminoacids, peptides (like glutathione) and proteins assures the water stability, biocompatibility and hence their potential biological applications.

The microwave-assisted synthesis of water-stable Cd-based QDs in the presence of thiol reagents represents a fast and one-step synthesis approach with less generation of hazardous waste.

Although the water-stable QDs with good optical properties synthesized using the microwave irradiation technique can find potential applications in nanotechnology, as-synthesized QDs will still require rigorous purification and control of the crystal size at the nanoscale. Accordingly, the development of a size-exclusive protocol with capability to purify and generate size-selected fractions from a suspension of nanocrystals becomes indispensable.

High performance size exclusion chromatography (HPSEC) has been used as a powerful tool to separate complex samples based on their sizes. HPSEC applications have been expanded to the characterization and separation of nanomaterials as semiconductor nanocrystals or quantum dots (QDs). The separation by HPSEC is based on purely entropic interactions between the pores of the polymeric material in the column and the nanomaterials while avoiding all other interactions such as polar-polar, nonpolar-nonpolar, electrostatic, among others. The unwanted interaction between the surface of functionalized Cd-based QDs and the polymeric material in the column would affect the precision of the correlation between the retention time and the hydrodynamic diameter or the molecular weight of the crystals.

HPSEC overcomes many of the limitations of other techniques used for the size-sensitive separation of nanoparticles. HPSEC has the advantage of being able to measure the hydrodynamic diameter of the nanoparticles suspended in an aqueous solution; this diameter includes the inorganic core and the organic coating (capping agent) of the QDs surface. Regarding the measurement of the actual nanocrystal size, previous related studies reported that Transmission Electron Microscopy (TEM) and Dynamic Light Scattering (DLS) techniques fail in the precise determination of the size in extremely small nanocrystals. In contrast, HPSEC is an efficient technique to determine the actual size of nanocrystals, particularly in the 0.5-10 nm range. Furthermore, HPSEC measurement includes millions of nanoparticles making the results statistically robust. Besides, HPSEC can also be considered a semi-preparative technique, which allows samples to be simultaneously separated, quantified and collected for further assays. Despite the promising application of SEC-based techniques, there are still few reports concerning their application in the analysis and separation of nanoparticles. Available literature indicates that the HPSEC-based separation of nanocrystals stabilized in organic solvents such as toluene is possible: Wilcoxon et al. used SEC to separate non-polar gold and silver nanoparticles; Krueger et al. separated nanocrystalline CdSe. Al-Somali et al. separated and analyzed a series of gold nanocluster fractions. Wang et al. isolated QDs of CdSe with dye labeled multidentate polymers. Apparently, nanocrystals soluble in organic solvents did not interact with the polymeric matrix of the columns, which allowed the use of commercially available columns. Also, the mentioned reports used organic solvents as the mobile phase. On the other hand, the use of commercial HPSEC columns for the separation of water-stable nanocrystals becomes troublesome due to the strong interactions between the nanocrystals and the polymeric matrix of the columns. Some authors assembled their own HPSEC columns using specific polymeric matrixes which allow the separation of specific nanocrystals. Arita et al. used nanoparticle repelling surfaces (concentrated polymer brush) to separate QDs and nanoparticles according to their sizes. In some cases the capping of nanocrystals with peptides or proteins also allowed the use of commercial columns designed to separate these kinds of molecules. Ding et al. used HPSEC to separate aqueous solution of CdSe functionalized with proteins using a commercial column. The limiting factor to the broad use of SEC-related approaches in aqueous medium relies on the customized selection and assembly of the stationary phase (column) to achieve the size-sensitive separation of targeted quantum dots.

SUMMARY OF THE INVENTION

The present invention provides a novel HPSEC-based method to separate different sizes of TGA-capped Cd-based QDs in the aqueous phase without the limitation of using a customized specific column.

In the present invention, a commercially available chromatographic column was used. To the best of the inventor's knowledge, this is the first time that thiol species as an ion pair agent in the mobile phase is used to suppress secondary interactions between the QDs surface and the polymeric material in the column.

The viability of present invention was confirmed with nanocrystals capped with peptides (glutathione-capped Cd(Se,S) QDs) which can be separated using commercial columns. A HPSEC system using a cascade of three HPLC detectors, UV/Visible absorption (VWD), Evaporative Light Scattering (ELSD) and Fluorescence (FLD), was used to separate and analyze the different size fractions.

BRIEF DESCRIPTION OF THE DRAWINGS

Further features and advantages of the invention will become apparent from the following detailed description taken in conjunction with the accompanying figures showing illustrative embodiments of the invention, in which:

FIG. 6 shows a table indicating the hydrodynamic diameters and estimated nanocrystal sizes for obtained fractions of TGA-capped Cd(Se,S) QDs according to the present invention.

Figure 1:
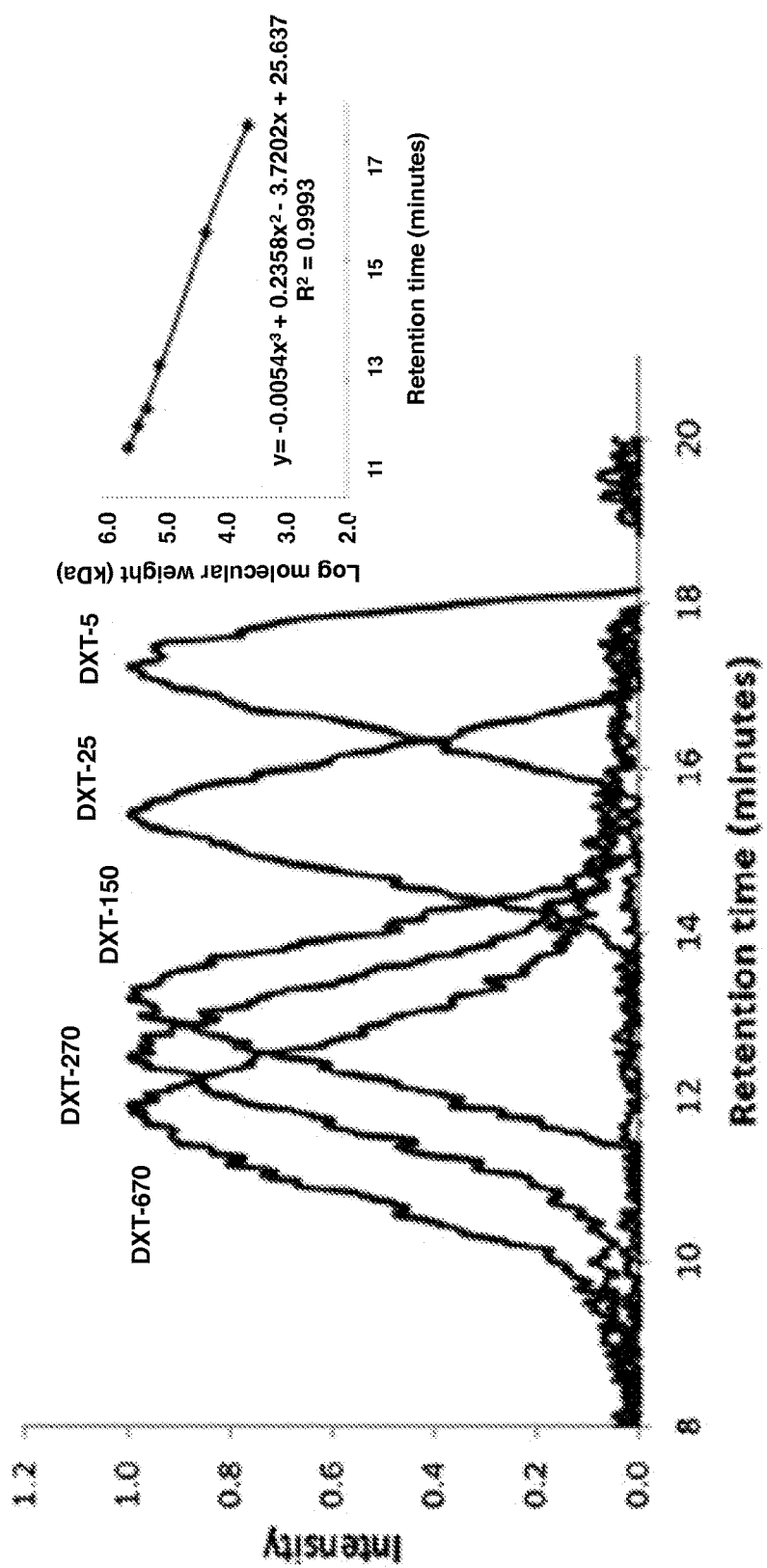
FIG. 1 shows chromatograms and calibration curves for dextran standards using an evaporative light scattering detector (ELSD) and 0.05% v/v of thioglycolic acid as the mobile phase according to the present invention.

Throughout the figures, the same reference numbers and characters, unless otherwise stated, are used to denote like elements, components, portions or features of the illustrated embodiments. The subject invention will be described in detail in conjunction with the accompanying figures, in view of the illustrative embodiments.

DETAILED DESCRIPTION OF THE INVENTION

Material and Methods
Synthesis of Water-Stable TGA-Capped QDs

A selenide solution was prepared by reducing selenium powder (99.99% trace metals basis) with sodium bisulfite (>98%). Cadmium sulphate (>98.0%) and selenium solutions were mixed with thioglycolic acid (TGA, ≥98%) at pH 7.00 and they were irradiated with 200 W at 140° C. for 30 minutes in a MARS XPRESS microwave system. The sulphur needed for the synthesis of nanocrystals was produced from the partial degradation of TGA under microwave irradiation. The Cd/TGA/Se molar ratio was 1/4.8/0.04, respectively. The resulting suspension was cooled down to room temperature and coagulated by adding 2-propanol. Recovered nanocrystals were centrifuged and resuspended in deionized water.

Preparation of Glutathione-Capped QDs

Synthesized Cd-based QDs were suspended in Phosphate Buffer Saline (PBS) and contacted with a 5.0% v/v of glutaraldehyde solution in deionized water. The final concentration of QDs was 1000 μg mL$^{-1}$. The suspension was shaken for 18 hours at 25° C. using a Rotamix unit set at 20 rpm. QDs were coagulated with 2-propanol and suspended in PBS in the presence of 10 mM L-glutathione. The solution was mixed for an additional 18 hours in the rotamix. Glutathione-capped QDs were purified and washed with 2-propanol and finally resuspended in deionized water.

Characterization Techniques

Synthesized quantum dots were dried in a vacuum system and structurally characterized by X-ray diffractometry (XRD) using a Siemens Powder Diffractometer D5000 and Cu-Kα radiation. A high-resolution TEM study was performed on a JEM-ARM200cF operated at 200 kV. UV-Vis absorption measurements were carried out using a Beckman DU 800 Spectrophotometer. A Shimadzu RF-5301 spectrofluorometer with spectral bandwidth 5-5 and a 150 W xenon lamp was used to obtain the photoluminescence (PL) spectra of the suspensions at room temperature. Perkin Elmer Paragon 1000 Fourier Transform Infrared (FT-IR) Spectroscopy was used to confirm the actual conjugation of the QDs. The hydrodynamic diameters of the QDs were measured using a Malvern Zeta size system.

High Performance Size Exclusion Chromatography (HPSEC)

An Agilent 1200 HPLC system, including 1200 binary pump, 1200 ALS injector, 1200 Thermal Column Compartment (TCC), 1200 Fluorescence Light Detector (FLD), 1200 Variable Wavelength Detector (VWD) and 1200 Evaporative Light Scattering Detector (ELSD), was used in these experiments. An aqueouscompatible gel column, Ultrahydrogel 1000, (WAT011535) with a pore size of 1000 A° and an Ultrahydrogel guard column (WAT011565, from Waters) were used in all separations. The wavelength of the VWD was set at 521 nm whereas the excitation and emission wavelengths of the FLD were set at 460 nm and 555 nm, respectively. TCC and ELSD temperatures were fixed at 40° C. and 90° C., respectively. The injection volume was 100 μL. The mobile phase used to separate TGA-capped Cd-based QDs was 0.05% TGA at pH 6.5 and the flow was 0.6 mL min$^{-1}$. The TGA-mobile phase was prepared immediately prior to the analysis to avoid volatilization, degradation or polymerization. The mobile phase for the analysis of glutathione-capped QDs was deionized water at pH 6.5. A calibration curve was obtained using 5.0 mg mL$^{-1}$ dextran standards (molecular weights in the 4.4-401 kD) in deionized water.

Results and Discussion
Characterization of TGA-Capped QDs and Glutathione-Capped QDs The X-ray diffraction (XRD) patterns of synthesized Cd-based QDs suggested the formation of a zinc blende structure. The presence of the diffraction peaks between those 2θ angles corresponding to bulk CdSe (JCPDS card 19-0191) and CdS (JCPDS card 42-1411) suggested the development of a solid solution of the type Cd(Se,S) (ESI†).

The average crystallite size of the nanocrystals was estimated by using the Scherrer equation at 3.2±0.4 nm. The nanometric size was confirmed by HR-TEM. FT-IR analyses revealed the linkage of TGA species to the QDs surface through the carboxylate groups in the thiol. The presence of thiol species on the QDs surface should stabilize the QDs in aqueous media. The presence of glutathione on the QDs surface was also confirmed by FT-IR spectroscopy measurements (ESI†).

Fractionation of TGA-Capped and Glutathione-Capped Cd(Se,S) QDs by HPSEC

The HPSEC separation of TGA-capped Cd(Se,S) QDs was firstly evaluated using deionized water only as the mobile phase. A poor separation was achieved under this condition; the polar groups (specifically thiol groups) of the TGA adsorbed onto the surface of the QDs could have interacted with the polar groups of the poly(methyl acrylate) polymer of the column, promoting dipole-dipole interactions. Moreover, the free —O—H groups in TGA should have favoured the hydrogen bonding with the carbonyl groups of the poly(methyl acrylate) material of the SEC column.

According to the present invention, the interactions between QDs and the column were suppressed using 0.05% w/w TGA as an ion pair agent. We hypothesize that TGA species in the mobile phase would be linked to the carbonyl group of the poly(methyl acrylate) polymer through hydrogen bonding. In this way, the —SH group of the TGA should be oriented outwards the polymer generating a net negative surface charge. FT-IR and NMR analyses evidenced that TGA is chemisorbed on the QDs surface through its carboxylate groups. The two oxygen atoms of the COO— group would be coordinated symmetrically to the surface Cd atoms forming a bridging bidentate complex. Under this premise, the —SH groups of the thiol molecule would be located at the free extreme of the adsorbed molecules providing a net negative surface charge on the QDs. Therefore, both negative charges would inhibit the interaction between the QDs and the polymeric column.

Using TGA as an ion pair, the fractionation of the QDs was evaluated using three different detectors: VWD, FLD and ELSD. Also, a standard curve using a set of certified dextran solutions of known molecular weights was also determined in the presence of TGA as an ion pair. FIG. 1 shows the chromatograms and the calibration curve for dextran standards using ELSD. The results were a little noisy due to the presence of TGA species, as ion pairs, in the mobile phase. No peaks were observed in the VWD and FLD because dextran molecules do not absorb UV/Vis light neither they are fluorescents. In order to determine whether there is an effect of TGA in the separation effectiveness, dextran standards were also injected using only deionized water as a mobile phase. The same retention times in both cases indicated that the ion pair agent did not affect the separation efficiency of the dextran standards.

Figure 2:
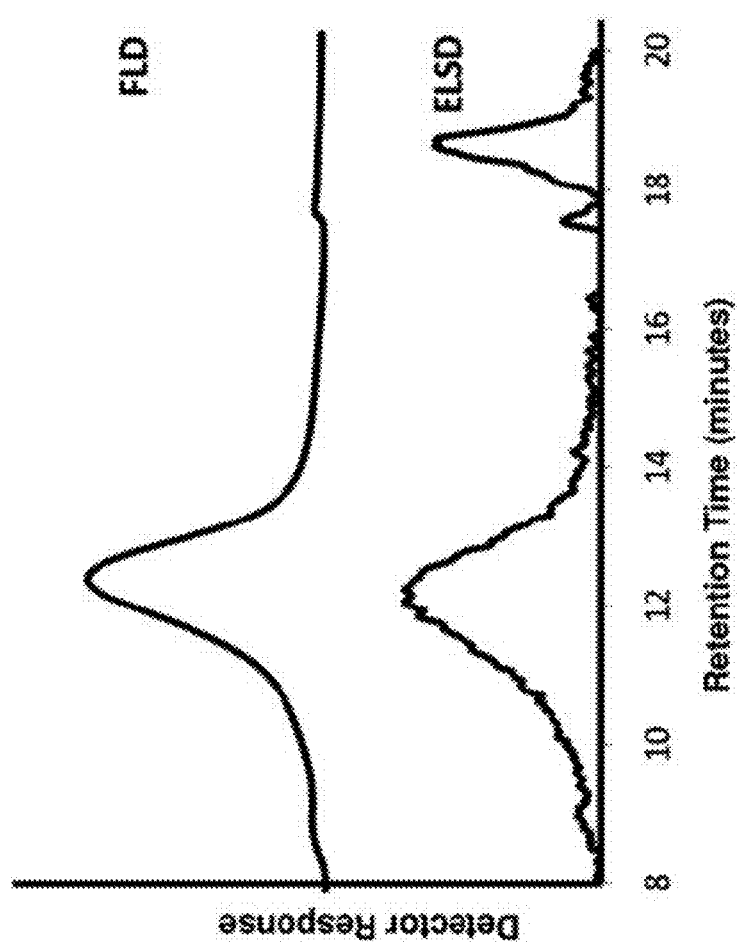
FIG. 2 shows chromatograms of the TGA-capped Cd(Se, S) QDs using fluorescence light (FLD) and evaporative light scattering (ELSD) detectors according to the present invention.

FIG. 2 shows the chromatograms corresponding to the fractioning of TGA-capped Cd(Se,S) QDs using FLD and ELSD simultaneously. Quantum dots, because of their fluorescence properties and non-volatile structure, should provide a clear signal by using these techniques. Therefore, the first peak at 12.5 min observed in both chromatograms can be considered evidence of the presence of quantum dots. In turn, the peak at 18.7 min of retention time was observed only when ELSD was used and could be due to the presence of polymerized thiol species. The small peak at 17.6 min in the FLD chromatogram of FIG. 2 was not isolated due to the possible contamination with polymerized thiol species.

Figure 4:
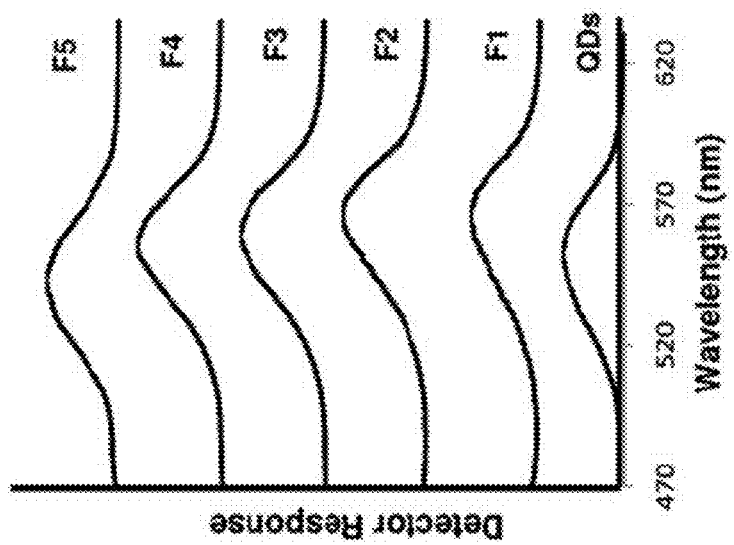
FIG. 4 shows photoluminescence (PL) spectra for the isolated fractions (F1 to F5) of TGA-capped Cd(Se,S) QDs according to the present invention.
Figure 3:
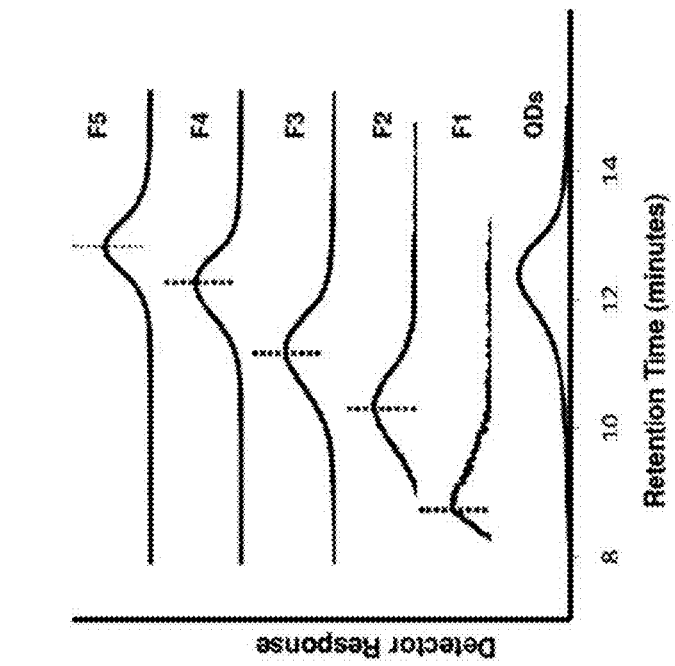
FIG. 3 shows chromatograms for the re-injected fractions (F1 to F5) and the starting TGA-capped Cd(Se,S) QDs suspension using a fluorescence light detector (FLD) according to the present invention.

In order to evaluate the size-sensitive fractioning of the QDs, the peak with retention times between 8.5 and 13.5 min was isolated. Five fractions were collected at different time intervals, namely: F1 (8.5 to 9.5 min), F2 (9.5 to 10.5 min), F3 (10.5 to 11.5 min), F4 (11.5 to 12.5 min) and F5 (12.5 to 13.5 min). Collected fractions were re-injected in the same column in order to verify that the obtained fractions represented different crystal sizes. FIG. 3 shows the FLD chromatograms of the re-injected fractions (F1 to F5) and the starting suspension of TGA-capped Cd(Se,S) QDs. As observed, re-injected fractions reported retention times in the same interval they were collected. The optical properties of QDs are strongly size-dependent; optical absorption and fluorescence peaks will be blue-shifted for smaller crystal sizes and red-shifted for the larger ones. On this basis, collected SEC fractions were characterized by UV/Vis and PL spectroscopy techniques. As expected, the UV/Vis absorption peaks for F1 (545 nm) and F2 (540 nm) were red-shifted (i.e. represents the fraction bearing the larger sizes) while F4 (522 nm) and F5 (519 nm) were blue-shifted (i.e. smaller crystal sizes) compared with the signal coming from the original sample: the absorption peak for this starting suspension of QDs was centered at 524 nm. FIG. 4 shows the photoluminescence spectra for the same five fractions and the original suspension of QDs. Also in this case, the emission peaks of the F1 and F2 fractions were red-shifted from 553 to 567 nm whereas the signals from the F4 and F5 fractions were blue-shifted from 553 to 543 nm when compared with the original sample; the emission peak for the original suspensions of QDs was centered at 553 nm.

The band gap energy for all size-selected fractions was estimated using the Tauc's equation as shown on the Table of FIG. 6. The band gap energy values corresponding to fractions 1 to 5 were increased from 2.16 eV to 2.57 eV, respectively, which is a consequence of the decrease in the size of the QDs. The fact that these band gap values are far above the value for bulk CdSe (1.73 eV) evidences the quantum confinement effect in the Cd(Se,S) QDs. The correlation between the band gap and QDs particle size previously reported was used to get a rough estimation of the crystal size in collected fractions. The hydrodynamic diameters (HD) corresponding to each fraction were also measured using the DLS technique as shown in FIG. 6.

The molecular weight associated with each size fraction (MW) was determined from the retention time at the maximum of the corresponding chromatogram peaks and the regression analysis of the calibration curve (FIG. 1). The retention times for fractions 1, 2 and 3 were out of the calibration range and their corresponding molecular weights were not estimated. In turn, the molecular weights of the fractions 4 and 5 were estimated to be 366 and 232 kD, respectively. This drop in the MW is in agreement with the expected decrease of the hydrodynamic diameter in each fraction. The table of FIG. 6 also shows that the thickness of the organic-shell, estimated by subtracting the estimated crystal size to the hydrodynamic diameter (HD), increased at larger HD and crystal size values. The organic-shell surrounding QDs can be rationalized in terms of the polymerization and adsorption of TGA species onto the QDs surface during the microwave-assisted synthesis stage. Related studies suggested that the use of small organic molecules, such as TGA, could promote the development of thick organic shells on the nanocrystal surface. This increase in the estimated thickness of the organic-shell can also explain the observed increase of the molecular weight in each SEC fraction.

The coating of Cd(Se,S) QDs with biocompatible organic molecules, e.g. glutathione, is desirable to enable their use in bioimaging and cell sorting. Accordingly, two fractions (F2 and F4) of bare QDs were capped with glutathione. The actual presence of glutathione on the QDs surface was confirmed using FT-IR analyses (ESI†). In order to evaluate a change in the molecular weight and hydrodynamic diameter in the presence of glutathione, the corresponding samples were also analyzed by HPSEC. Initially, the two fractions (F2 and F4) of QDs capped with glutathione were analyzed using two mobile phases: 0.05% TGA or deionized water. There were no differences between the chromatograms corresponding to those two mobile phases, which suggested that glutathione functional groups did not interact with the surface of the polymeric matrix in the column irrespective of the type of the mobile phase. The absence of interaction between glutathione and polymeric surfaces irrespective of the type of the mobile phase was also suggested by others. Deionized water was selected as the mobile phase for the subsequent measurements, due to the noisy response obtained in the presence of thiol as the mobile phase.

Figure 5:
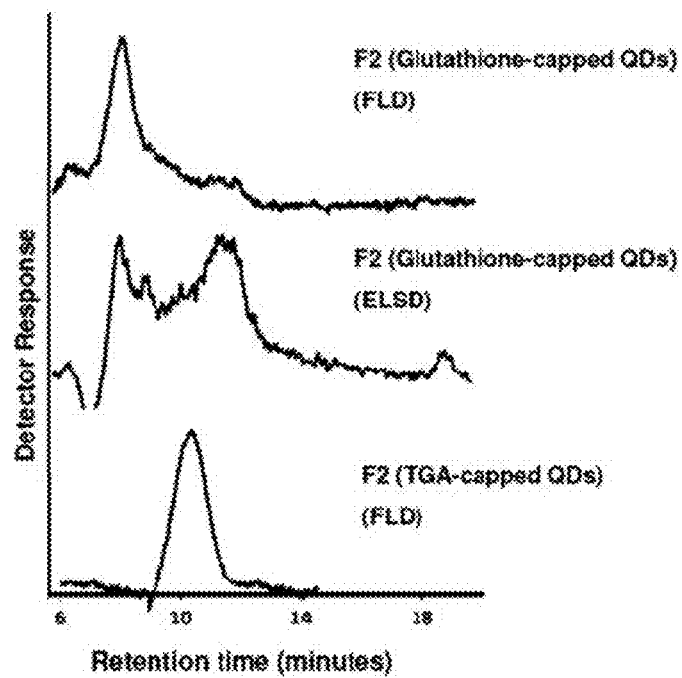
FIG. 5 shows chromatograms of fractions F2, (A) and F4, (B) corresponding to those QDs capped with glutathione according to the present invention.
Figure 5:
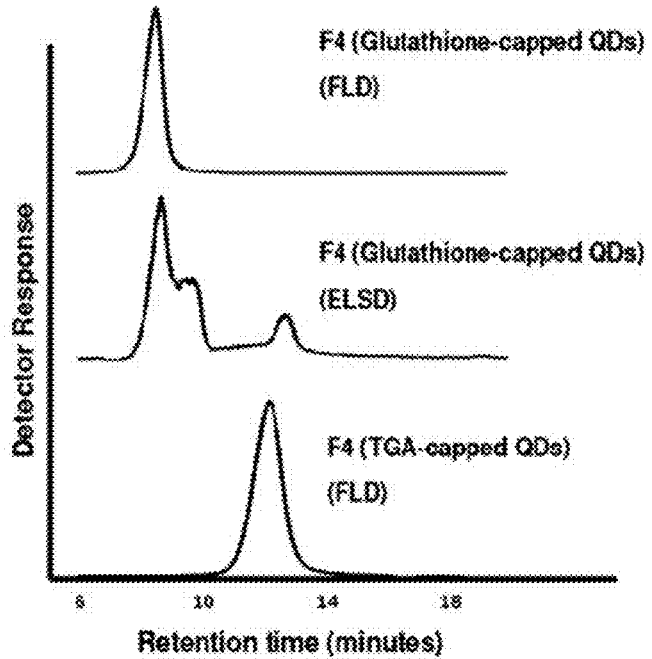

FIG. 5 shows the chromatograms of the glutathione-capped QD fractions using ELSD and FLD, wherein chromatograms of fractions F2, (A) and F4, (B) corresponding to those QDs capped with glutathione. The chromatograms were recorded using fluorescence light (FLD) and evaporative light scattering (ELSD) detectors. The spectra at the bottom of each figure correspond to the FLD chromatograms of non-functionalized, i.e. bare, fractions F2 and F4 of TGA-capped Cd(Se,S) QDs. Generally speaking, the shortening of the retention times, associated with the size enlargement, can be attributed to the coating of the QDs with glutathione species. ELSD chromatograms evidenced the presence of extra peaks (retention times at 17.8 and 18.9 minutes) that would correspond to polymerized glutathione species. The retention times of the peaks in the chromatograms for the F2 and F4 samples decreased from 10.3 to 8.3 minutes and 12.1 to 8.6 minutes, respectively, after the TGA-capped QDs were capped with glutathione. Consequently, the observed drop in the retention times can be attributed to the enlargement of the QD-glutathione hydrodynamic size. Glutathione-capped fractions exhibited an optical response similar to the TGA-capped ones; UV-Vis and PL spectra evidenced that the optical absorption and luminescence were not affected by the presence of glutathione on the QD surface (data not shown here). Accordingly, it becomes apparent that the crystal size of the QDs in each SEC fraction did not change even after their covering with glutathione species.

CONCLUSIONS

The use of TGA as an ion pair agent in the aqueous mobile phase of HPSEC inhibited unwanted interactions between the QDs and the polymeric matrix of the column, which facilitated the size-sensitive separation at the nanoscale. Accordingly, HPSEC can be used to purify and isolate QD fractions with different sizes in the aqueous phase. The HPSEC applicability in water suspension was demonstrated; five fractions of different QD sizes, with hydrodynamic diameters ranging from 24.8 nm to 98.2 nm, and tunable optical properties were obtained. HPSEC was also used to confirm the enlargement of the size of TGA-Cd(Se,S) QDs after their covering with an organic molecule of high molecular weight like glutathione.

Although the present invention has been described herein with reference to the foregoing exemplary embodiment, this embodiment does not serve to limit the scope of the present invention. Accordingly, those skilled in the art to which the present invention pertains will appreciate that various modifications are possible, without departing from the technical spirit of the present invention.

We claim:

1. A method for inhibiting unwanted interactions between thiol-capped Cd(Se,S) quantum dots (QDs) and the polymeric matrix of a column used on a high performance size exclusion chromatography (HPSEC) system when separating said thiol-capped Cd(Se,S) quantum dots (QDs), said method comprising:
using thioglycolic acid (TGA) as an ion pair agent in the aqueous mobile phase of said (HPSEC) system, wherein said (TGA) generates a net negative charge on a surface of the polymeric matrix of said (HPSEC) and a net negative charge on a surface of said thiol-capped Cd(Se,S) quantum dots (QDs) so that both negative surface charges inhibit the interaction between the thiol-capped Cd(Se,S) quantum dots (QDs) and the polymeric matrix of said column when separating said thiol-capped Cd(Se,S) quantum dots (QDs).

2. The method of claim 1, wherein said mobile phase comprises 0.05% TGA at pH 6.5 with a flow of 0.6 mL min-1.

* * * * *